United States Patent [19]

Skaria et al.

[11] 4,043,803

[45] Aug. 23, 1977

[54] PROCESS FOR THE MANUFACTURE OF A COMPACTED SYNTHETIC FLUX BASED ON CALCIUM FLUORIDE

[75] Inventors: Arankathu Skaria, Stafe; Reiner Stark, Fallanden, both of Switzerland

[73] Assignee: Swiss Aluminium Ltd., Chippis, Switzerland

[21] Appl. No.: 557,370

[22] Filed: Mar. 11, 1975

[30] Foreign Application Priority Data

Mar. 15, 1974 Switzerland .......................... 3612/74

[51] Int. Cl.$^2$ .......................... C22B 9/10; C01D 3/02
[52] U.S. Cl. .................................. 75/257; 75/10 R; 423/158; 423/490
[58] Field of Search .................. 75/10 R, 94; 148/26; 423/158, 490

[56] References Cited

U.S. PATENT DOCUMENTS

| 3,366,444 | 1/1968 | Laferty | 423/490 |
|---|---|---|---|
| 3,627,592 | 12/1971 | Schmidt | 148/26 |
| 3,842,161 | 10/1974 | Hyoky | 423/490 |

FOREIGN PATENT DOCUMENTS

| 979,583 | 1/1965 | United Kingdom | 75/10 R |

Primary Examiner—Peter D. Rosenberg
Attorney, Agent, or Firm—Ernest F. Marmorek

[57] ABSTRACT

A process for producing a compacted calcium fluoride based synthetic flux from an aqueous effluent containing fluorine ions, by precipitating fluorine ions as calcium fluoride, reducing the water content of the precipitate to the range from about 10 percent to 30 percent by weight, mixing the precipitate with a binding agent, compacting the mixture and thereafter drying the compacted mixture.

18 Claims, No Drawings

PROCESS FOR THE MANUFACTURE OF A COMPACTED SYNTHETIC FLUX BASED ON CALCIUM FLUORIDE

The invention presented here concerns a process for the manufacture of a compacted synthetic flux of high mechanical strength and which is based on calcium fluoride which is recovered from waste liquors containing fluorine ions which are not associated with alkaline metal ions. This process permits, amongst other things, the utilisation of accumulated fluorine in a simple and economic manner and its separation before the point of releasing into the sewage system. It concerns therefore a process which fulfills economic and ecological requirements. The product obtained by the process can be used as a valuable fluxing agent in particular in the steel industry.

With the process of the invention all fluorine containing effluents, including dilute concentrations, can be used as the starting material, under the condition that they contain no alkaline metal ions. This ensures that the end product i.e. the flux contains no alkaline metal ions. The mother liquor from the crystallisation of aluminium fluoride is a particularly useful starting solution; for this reason the main emphasis of the following description of the process relates to this mother liquor.

The mother liquors which result from the production of aluminum hydroxide with fluorosilicic acid in accordance with the equation $$Al_2O_3 \cdot 3H_2O + H_2SiF_6 = 2 AlF_3 + SiO_2 + 4H_2O$$

usually contain approximately 20 g/l of fluorine in the form of simple or complex anions together with aluminium, silicon and other elements as impurities. About 10% of the fluorine put into the process for the manufacture of aluminium fluoride is left in the mother liquor, a fact which is not of negligable economic importance.

These mother liquors can, at least in part be used again in quantities in which the accumulation of impurities in the solution used in production, is not excessive or hazardous with respect to the quality of the product.

In order to avoid the disadvantages of re-use of the solution, various processes for recovering the fluorine in the mother liquors have already been proposed. One of these processes is such that the dissolved aluminium fluoride is allowed to react with ammonia or ammonium salts to precipitate a compound of the ammonium chiolite type which can be decomposed by pyrolysis into ammonium fluoride and recyclable aluminium fluoride. This process presents however certain problems of economical and technical nature with respect to the recycling of the ammonium fluoride and ammonia.

Other processes provide for the precipitation of the aluminium fluoride in the form of cryolite, in which a sodium salt is added, in particular sodium fluoride usually under very specific conditions regarding the pH-value concentration etc. In spite of all precautions however the cryolite obtained this way is generally difficult to filter and in particular it often contains significant quantities of impurities (e.g. $SiO_2$), which limit the application of the product. The market for this product is furthermore quite limited today. For this reason, in production, no recovery of the fluorine residues in the mother liquor has been undertaken up to now. The only steps which have been taken have been for example to treat this mother liquor with lime in order to precipitate the fluorine ions as calcium fluoride so as to fulfil the requirements for the protection of the environment. The residues obtained are then emptied out onto a waste dump; it is clear that this method of treatment is questionable, not only from the point of view of economics (loss of fluorine) but also with respect to ecology (waste dumps).

The object of the invention is to utilise the fluorine in this mother liquor in a simple and economic manner, in the form of a product with good possibilities for application, in particular as synthetic flux with high mechanical strength and which exhibits the necessary chemical and mechanical features.

This has become possible thanks to a process in which the following operation stages are carried out in the sequence given:

a. Precipitation of the dissolved fluorine ions by the addition of a calcium compound, maintaining a molar ratio of Ca/2F of between 1 and 2 and finally by settling out the precipitate obtained.

b. Partly calcining the above mentioned precipitate until complete removal of the free water and a part of the water of crystallisation.

c. Forming, by kneading together, out of the following components, a mixture which is then compacted:
   the product from stage (b)
   14–25% water, with respect to the product mentioned in stage (b)
   a bonding agent
   at least one alkaline earth metal oxide and/or hydroxide d. Compacting the above mixture e. Drying the compacted product After carrying out the various operation stages of the process, as mentioned above, a hard compacted end product with relatively little volatile constituent ($H_2O$) . . . is obtained.

If, meanwhile, the endproduct may have a higher content of volatile constituents, without it being a disadvantage in its later use, or can even be porous to a greater or lesser degree, but exhibits a good fracture strength, then the above process can be simplified in that the partial calcination (b) can be substituted by partial drying until the freewater content of the product is 10–30%, whereby the addition of water in stage (c) can be omitted.

The stages of the process are then as follows:
a. Unchanged
b. Partial drying of the product until the free-water content is between 15 and 30%.
c. Unchanged, except that the addition of water is omitted
d. Unchanged
e. Unchanged, but the drying temperature is preferably much higher.

Now that all the stages which characterize the process of the invention have been outlined, the individual operations will be considered in detail.

a. Precipitation of the dissolved fluorine ions in the mother liquor or effluents using a calcium compound.

As has already been said, this stage concerns a reaction which in itself is known but which is normally only used to "neutralise" the fluorine ions, i.e. in other words a reaction, the control of which depends more or less on experience. In the case being considered here the aim is to utilise the precipitate obtained.

The large number of trials which have been carried out to this end have shown that if one wishes to obtain a quality product which is easy to compact, the molar ratio Ca/F$_2$ of the reaction mixture must lie between 1 and 2, preferably 1.05 and 1.4.

The calcium is preferably added in the form of calcium hydroxide, in particular in suspension, as lime milk. The temperature at which the precipitation is carried out is not in itself critical. It has been found however that with respect to obtaining an easily separable precipitate it is advantageous to perform this stage at a temperature between 20° and 80°, preferably 45 and 55° C.

The precipitate obtained is then separated from the mother liquor by a standard process, for example by centrifuging. The mother liquors contain only insignificant traces of fluorine and can without hesitation be released to the sewer system.

b. Partial calcination of the precipitate.

The composition of the precipitate depends on the composition of the starting solution. When the starting solution is the mother liquor of the crystallisation process of aluminium fluoride then the precipitate contains besides calcium fluoride, amongst other things, aluminium, silicon and iron and a certain amount of water.

The water present is made up of free water which constitutes the degree of dampness, and the water of crystallisation which is bound into the compound. The free water can be driven off in a simple drying process at temperatures from 105°–110° C upwards, whilst the water of crystallisation, depending on the compound, requires a much higher temperature (calcining), to be partly or completely driven off. Thus for example, a precipitate obtained from an AlF$_3$ mother liquor can contain up to 70% free water and approximately 2–4% water of crystallisation (with respect to the original damp product).

In the course of the investigations on which the invention is based, it was found surprisingly that the water content of the product, which is specified for the kneading and compacting stages, is also of considerable importance for the later stages of the process. Thus in terms of the invention there are two practical possibilities for the process:

The first permits a compact product with the lowest possible degree of porosity and particularly high mechanical properties (fracture strength, abrasion resistance . . .), the second leads to a product which can likewise be compacted, but exhibits a higher degree of porosity.

In the first, preferred version the free water of the product is driven off completely and a part of the water of crystallisation too, by partial calcination. In this case it is necessary afterwards to add 14–25% water, with respect to the product obtained, in order to manufacture a mixture for compacting. This degree of re-forming the hydrate is critical and must not be lower or higher than the specified amount if a compact product with a low degree of porosity and resistant to thermal shock is to be obtained afterwards. The temperature of the partial calcination is preferably between 300° and 700° C, the duration as a function of the degree of dehydration depends on the temperature. In the other version of the process the precipitate is simply dried until its free-water content is reduced to 15–30%. Obviously, in this case no water of hydration need be added during the preparation of the mixture for kneading before compacting. The drying can for example be carried out at temperatures from approximately 120°–140° C but there is nothing to prevent the treatment temperature from being higher and the duration correspondingly shorter, with the assumption of course that the limits on the above mentioned free-water content are observed.

c. Composition of the mixture to be compacted

The mixture, not considering the starting material i.e. the precipitate which has been brought to a certain level of hydration by partial calcination and rehydration, or by controlled drying, must consist of a binding agent and at least one alkaline earth metal oxide and/or hydroxide. Further additions can be added but they are not in themselves essential to the process. As far as the binding agent is concerned, a material which is normally used for this purpose e.g. bitumen and molasses, can be used. The trials showed for example that good result are obtained using molasses which are also advantageous from the standpoint of economics.

The proportion of binding agent added can vary within certain limits according to its nature. In the case of molasses for example these limits are relatively critical and must be between 4 and 6% of the starting material.

In the course of the trials to refine the process it was found, surprisingly, that in order to achieve the subsequent compacting of the mixture, the addition of a conventional binding agent is necessary, but not sufficient, and that in addition, prior to the compacting operation, at least one alkaline earth metal oxide and/or hydroxide must be added. The trials showed that excellent results are obtained using calcium oxide and/or calcium hydroxide. The calcium compounds can however be replaced partially or completely for example by the corresponding magnesium compounds; this can even be desireable if for technological reasons one wishes to introduce magnesium into the flux mixture which is to be compacted. For this purpose calcined and hydrated dolomite is used with success. It is worth stressing that the proportion of alkaline earth metal oxide and/or hydroxide added to the mixture lies between 4 and 12% (expressed in equivalents of CaO), and in particular between 6 and 9%.

d. Compacting

The compacting by the usual method offers no special difficulties, however with the provision that the mixture to be compacted has been worked and has the composition described above. This compacting can for example be carried out continuously in a cylinder press in which the mould surface is designed to give the desired shape of product. This is obviously a minimum pressure which amongst other factors depends on the shape, the dimensions, and the composition of the product and which has to be determined by experience. In the case of a compacted mass of 28 × 22 × 12 mm for example, and which in long cross section is oval, the specific compressive force is at least 2 t per cm "active" length of the above mentioned cylinder.

e. Final drying

The compacted product must be given a final drying to eliminate practically all the free water which it contains in order to obtain optimal mechanical properties. This drying can, if the fluorine-containing starting material has already been subjected to a partial calcination before compacting, take place at low temperature (for example 120°–14° C), whilst if the starting material has not been partially dried then a higher temperature (for example 300°–700° C) is used.

It is worth stressing that the product obtained (synthetic flux) exhibits high mechanical strength/good mechanical properties (fracture strength, abrasion resistance...) and a high degree of stability when subjected to thermal shock. Thus for example the fracture strength of the product of the above type, measured in the usual manner, easily reaches and exceeds 50 kg per piece.

The final product produced this way is a synthetic flux which possesses all the properties to be used to advantage for example in the steel industry.

The process of the invention permits therefore three problems to be solved, simply and in an economic way, viz., the utilization of significant quantities of fluorine from effluents the purification of spent solutions, so that they can be released to the sewer system and at the same time comply with the requirements for the protection of the environment the manufacture of a synthetic flux which meets the requirements of the steel industry.

Further features and advantages of the invention are made clearer by way of various examples.

EXAMPLE 1

The starting solution comprised the mother liquor which results from the production of aluminium fluoride through the reaction of fluorosilicic acid with aluminium hydroxide.

It contained 21 g/l F
6.6 g/l Al and small quantities of Si, Fe etc. 25 kg of industrial grade hydrated lime (Ca content = 48.5%), which was in suspension in approximately 10 liters of water, was added to 500 liters of this mother liquor. The molar ratio Ca/2F was then almost 1.1. The mixture was raised to the temperature of 50° C and then stirred for 20 minutes. The pH was about 7.5. After filtering off the precipitate the resultant mother liquor contained only 45 ppm fluorine and could be released to the sewage system.

The damp precipitate contained approximately 70% free water and 2.4% water of crystallisation. It was partially calcined at 450° C in order to achieve complete removal of the free water and partial removal of the water of crystallisation. The product (35.8 kg) obtained, and which is subsequently called the "starting material", was composed of the following elements in the quantities listed viz., Ca; 32.7 wt %
F; 29.3 wt %
Al; 9.2 wt %
Si; 4.8 wt %
Fe; 0.2 wt %

The starting material was then used in a series of systematic trials. The most important trials are described schematically in the following:

Trial 1.1

2 kg of starting material was throughly kneaded together with

2% $H_2O$ (with reference to the starting material)
3% lime milk (with 48.6% Ca)

and then compacted into pieces (28 × 22 × 12 mm) in a machine of the usual cylindrical type and with a compressive force of 2 t/cm².

The result was negative: the compacted pieces obtained were fragile.

Trial 1.2

The same as in trial 1.1 with the only difference that 4% of molasses was added to the mixture to be kneaded.
Result was negative.

Trial 1.3

The same as in trial 1.1 but the quantity of lime milk was increased from 3 to 10%.
Result was negative.

Trial 1.4

Same as in trial 1.3 but with an addition of 4% molasses.
Result was negative.

Trial 1.5

2 kg of the starting material was kneaded together with

14% $H_2O$
10% lime milk
4% molasses and then compacted as in trial 1.1. Even in the unfinished condition the piece obtained exhibited an excellent crushing strength of approximately 9–10 kg per piece. After drying for 2 hours at 140° C the strength rose to 50 kg per piece. The apparent density of the synthetic flux was 1.86 g/cm³.

Trial 1.6

Same as in trial 1.5 except that the quantity of lime milk was reduced from 10% to 3% (in CaO equivalents from 7.55 to 2.5%).

Result was negative: The pieces obtained were hard, but cracked and not able to withstand mechanical shock.

This series of trials shows that the composition of the mixture plays a decisive role; the results of the trials 1.1 – 1.4 were negative because the quantity of water added to the starting material was insufficient to restore the hydrate. Trial 1.6 shows that the proportion of lime added must be of a certain minimum value.

EXAMPLE 2

The same starting solution and conditions for precipitation as in example 1. The quantity of industrial grade hydrated lime was however 31.6 kg, raising the molar ratio Ca/2F from 1.1 to 1.4. The pH value settled at approximately 9. After filtering of the precipitate the mother liquor contained only 10 ppm fluorine.

The damp precipitate contained approximately 70% free water and 3.9% water of crystallisation. Instead of partially calcining this precipitate as in example 1, it was simply heated for 2 hours at 150° C, the free water content falling to 28.1% as a result of this. The product obtained (54.9 kg), referred to subsequently as the "starting" material, had the following composition.

Ca 27.3%
F 19.1%
Al 6.0%
Si 3.1%
Fe 0.2%
$H_2O$ 28.1%

This starting material was then used in a series of trials the most important of which are described briefly:

Trial 2.1

2 kg of starting material was kneaded together with
3% lime milk
4% molasses
2% H₂O
and then compacted as in trial 1.1.

Result was negative: The degree of cohesion of the compact was clearly insufficient.

Trial 2.2

The same as in trial 2.1 but the quantity of lime milk was raised to 10%.

Result: The mixture could be compacted easily. The fracture strength was 11 kg per piece before drying, and after drying for 2 hours at 140° C was more than 50 kg per piece. The apparent density of the final product was 1,80 g/cm³.

This trial showed that it is not important to add water during the kneading operation if the starting material has been dried by an amount within specified limits; in this case it is important that the proportion of calcium hydroxide added is sufficiently large.

The drying after the compacting is carried out at a higher temperature, for example 400° C, in order to remove the water quickly and completely, then the compacts almost keep their shape and their mechanical strength, but are more porous.

Trial 2.3

Same as trial 2.2 but a compression force of 1,5 t/cm was used, instead of 2,0 t/cm as in all the other trials.

Results: The compacts were crumbly and could not be used for the purpose intended.

Trial 2.4

Same as trial 2.2 but the lime milk was replaced by an equivalent amount of calcined and re-hydrated dolomite (Mg (OH)₂ + Ca (OH)₂).

Result: The compact were of good quality. After only a simple drying of 15 min at 140° C their fracture strength reached 25 - 30 kg per piece.

What we claim is:

1. A process for producing a compacted, calcium fluoride based, synthetic flux from an aqueous effluent containing dissolved fluoride ions,
   the steps comprising:
   precipitating the dissolved fluorine ions essentially as calcium fluoride by the addition of calcium compounds;
   separating the precipitate from the effluent and reducing the free water content of said precipitate to a content of from about 10 percent to about 30 per cent by weight;
   mixing the separated precipitate with a binding agent and with at least one alkaline earth metal compound selected from the group consisting of oxides and hydroxides;
   compacting said mixture; and
   subsequently drying the compacted mixture.

2. A process as claimed in claim 1 wherein the free water of the precipitate is reduced to a content of about 10 percent to about 30 percent by weight by the step of partially calcinating said precipitate until the free water is completely removed and the water of crystallization is at least partially removed; and
   mixing water into the precipitate of from about 14 percent to about 25 percent by weight.

3. A process as claimed in claim 1 wherein the free water of the precipitate is reduced to a content of about 10 percent to 30 percent by weight by drying.

4. A process, as claimed in claim 1 wherein said calcium compound comprise calcium hydroxide.

5. A process, as claimed in claim 1 wherein the calcium compounds are added in amounts calculated to provide at least one calcium ion for every two fluorine ions dissolved in the effluent, whereby essentially all of the fluorine may be precipitated from solution.

6. A process, as claimed in claim 5 wherein there are added between one and two calcium ions for every two fluorine ions to be precipitated.

7. A process, as claimed in claim 5 wherein there are added between 1.05 and 1.4 calcium ions for every two fluorine ions to be precipitated.

8. A process, as claimed in claim 1 wherein the effluent is maintained at a precipitating temperature of approximately 20° to 80° Centigrade during the precipitating of the fluorine ion.

9. A process, as claimed in claim 8 wherein said precipitating temperature is maintained in the range of approximately 45° to 55° Centigrade.

10. A process, as claimed in claim 16, wherein said calcination temperature is in the range of about 450° to about 600° Centigrade.

11. A process, as claimed in claim 1, wherein said binding agent comprises molasses.

12. A process as claimed in claim 1 wherein said alkaline earth metal compound is added in an amount expressed as equivalents of CaO of about 4 to 12% of the starting material.

13. A process, as claimed in claim 12 wherein approximately 6 - 9% of said alkaline earth metal compound, expressed as equivalents of CaO, is added.

14. A process as claimed in claim 12 wherein said alkaline earth metal compound comprises calcium hydroxide.

15. A process as claimed in claim 12 wherein said alkaline earth metal compound is added in the form of calcined, then rehydrated dolomite.

16. A process according to claim 2 in which the partial calcination of the precipitate is carried out at a calcination temperature between 300° and 700° C.

17. A process according to claim 3 wherein the drying of the precipitate is carried out at a temperature between 120° and 140° C.

18. A process according to claim 11 wherein the quantity of molasses added amounts to between 4 and 6% by weight of the starting material.

* * * * *